(12) United States Patent
Uhlin

(10) Patent No.: US 10,234,328 B2
(45) Date of Patent: Mar. 19, 2019

(54) VIBRATION SENSOR OF MAGNETIC TYPE

(71) Applicant: Per-Axel Uhlin, Ängelholm (SE)

(72) Inventor: Per-Axel Uhlin, Ängelholm (SE)

( * ) Notice: Subject to any disclaimer, the term of this patent is extended or adjusted under 35 U.S.C. 154(b) by 264 days.

(21) Appl. No.: 15/309,317

(22) PCT Filed: May 8, 2015

(86) PCT No.: PCT/SE2015/000025
§ 371 (c)(1),
(2) Date: Nov. 7, 2016

(87) PCT Pub. No.: WO2015/171035
PCT Pub. Date: Nov. 12, 2015

(65) Prior Publication Data
US 2017/0067775 A1 Mar. 9, 2017

(30) Foreign Application Priority Data
May 9, 2014 (SE) ........................ 1400236

(51) Int. Cl.
*G01H 11/02* (2006.01)
*G01V 1/18* (2006.01)
(Continued)

(52) U.S. Cl.
CPC .............. *G01H 11/02* (2013.01); *G01V 1/18* (2013.01)

(58) Field of Classification Search
CPC .......... G01H 11/02; G01H 11/04; G01V 1/18; G10K 9/13; H01F 1/00
(Continued)

(56) References Cited

U.S. PATENT DOCUMENTS 2,015,410 A 9/1935 Prescott
3,581,129 A 5/1971 Ganter et al.
(Continued)

FOREIGN PATENT DOCUMENTS

EP 0 316 217 A1 5/1989
EP 1 050 743 A2 11/2000
(Continued)

OTHER PUBLICATIONS

International Search Report dated Aug. 18, 2015 for Application No. PCT/SE2015/000025.
(Continued)

*Primary Examiner* — Manish S Shah
*Assistant Examiner* — Suman K Nath
(74) *Attorney, Agent, or Firm* — Ladas & Parry LLP; Malcolm J. MacDonald

(57) ABSTRACT

A vibration sensor having at least one magnet and at least one coil, a first leg having a first and second mounting positions, and a second leg having first and second mounting positions, wherein a coil unit having a coil is arranged at the first mounting position of the first leg, and wherein a permanent magnet holder with a magnet is arranged at the first mounting position of the second leg, and the coil unit surrounds the magnet unit so that the magnet unit can move relative to the coil unit and be surrounded by the coil unit, and wherein the first leg, in the second mounting position, is arranged with a spacing relative to the second mounting position of the second leg, so that the first leg at the first mounting position is arranged spring-like with respect to the second leg at the first mounting position.

10 Claims, 2 Drawing Sheets

Sensor version A

Figure 1:
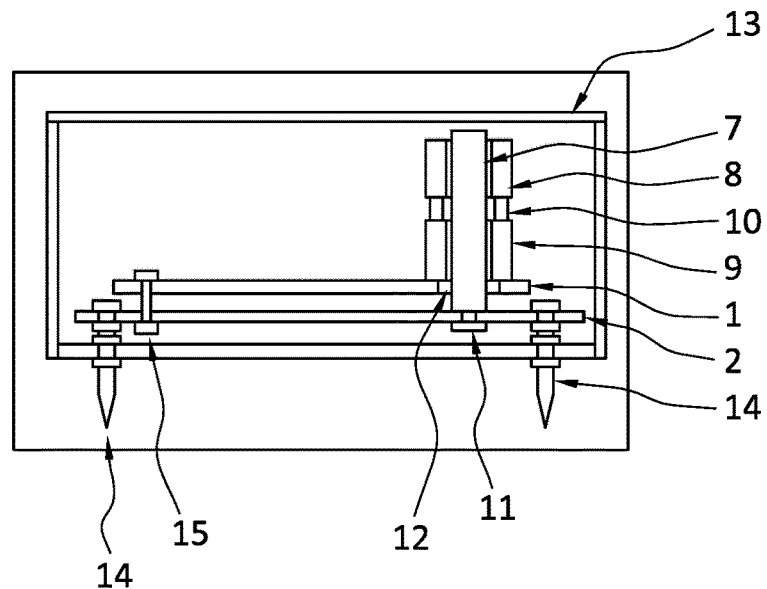

(51) Int. Cl.
*G01H 11/04* (2006.01)
*G10K 9/13* (2006.01)
*H01F 1/00* (2006.01)

(58) Field of Classification Search
USPC .................. 73/658, 643; 181/108, 112, 122
See application file for complete search history.

(56) References Cited

U.S. PATENT DOCUMENTS

| | | | |
|---|---|---|---|
| 4,777,833 A | 10/1988 | Carpenter | |
| 5,903,076 A * | 5/1999 | Suyama | B06B 1/045 310/13 |
| 6,274,955 B1 * | 8/2001 | Satoh | B06B 1/04 310/71 |
| 6,488,117 B1 * | 12/2002 | Owen | G01V 1/143 181/102 |
| 7,598,820 B2 | 10/2009 | Alvarez et al. | |
| 7,795,763 B2 | 9/2010 | Harris et al. | |
| 8,324,562 B2 | 12/2012 | Bierhoff et al. | |
| 8,684,945 B2 | 4/2014 | O'Brien | |
| 2007/0085425 A1 * | 4/2007 | Hirashima | H02K 33/16 310/15 |
| 2008/0055013 A1 | 3/2008 | Alvarez et al. | |
| 2010/0175476 A1 | 7/2010 | Jacob et al. | |
| 2012/0046580 A1 | 2/2012 | O'Brien | |

FOREIGN PATENT DOCUMENTS

| | | |
|---|---|---|
| EP | 1 085 654 A2 | 3/2001 |
| EP | 1 091 189 A1 | 4/2001 |
| EP | 1 217 735 A1 | 6/2002 |
| EP | 1 249 684 A2 | 10/2002 |
| EP | 1 369 666 A2 | 12/2003 |
| EP | 1 912 075 A1 | 4/2008 |
| EP | 1 914 511 A2 | 4/2008 |
| EP | 1 192 497 B1 | 9/2008 |
| EP | 1 976 115 A1 | 10/2008 |
| EP | 1 173 773 B1 | 4/2010 |
| EP | 2 278 273 A1 | 1/2011 |
| EP | 2 352 227 A1 | 8/2011 |
| EP | 2 607 906 A1 | 6/2013 |
| SE | 1300442 A1 | 12/2014 |
| WO | 91/03716 A1 | 3/1991 |
| WO | 02/087488 A1 | 11/2002 |
| WO | 2004/100364 A1 | 11/2004 |
| WO | 2004/100365 A1 | 11/2004 |
| WO | 2006/032106 A1 | 3/2006 |
| WO | 2011/012741 A2 | 2/2011 |
| WO | 2014/204376 A1 | 12/2014 |

OTHER PUBLICATIONS

Espacenet English abstract of EP 1 912 075 A1.
Espacenet English abstract of EP 0 316 217 A1.

* cited by examiner

Sensor version A

Sensor version B

Sensor version C

VIBRATION SENSOR OF MAGNETIC TYPE

TECHNICAL FIELD

The present invention deals with a motion-detecting sensor of the magnetic type. The sensor according to this invention is designed to receive and detect mechanical vibrations from the surface on which it is placed and to convert these vibrations into an electrical signal which can be detected, recorded and evaluated.

PRIOR ART

In the detecting of vibrations arriving through various soil materials or water for example, seismographs or the like based on the present principle are customary. Sensors for measurement of vibrations are also commonly used to detect any inhomogeneous frequencies and/or variable quantities for amplitudes in rotary layouts such as motors and/or to detect wave propagation or turbulence in pipes and/or piping systems and/or to protect bridges or other buildings from vibrations created, for example, by cars, trains, or affected by earthquakes.

If one surveys this field of sensors and entire sensor systems—including sensors, wireless transmission and reception of signals, recording and analysis equipment for motions or vibrations—we can find quite a lot of examples of systems for metering and/or recording, such as follows for example from the following list of searched patents. Since the size of the field is vast, the list could be extended.

By measuring vibrations in accordance with the technique of patent No. SE1300442-9, this system based on the tuning fork principle will give much better results and more powerful signals than any other unit or system now on the market.

Other prior art is described, for example, in the patent documents U.S. Pat. Nos. 8,684,945, 8,324,562, 7,795,763, 7,598,820, 4,777,833, EP1217735, EP1192497, EP1249684, EP 1173773, WO2011012741(A2), EP2607906, EP2278273, EP2352227, EP2078207, EP1914511, EP1976115, WO2006032106, WO2004100365, WO2004100364, EP1369666, WO02087488, EP1091189, EP1085654, EP1050743, WO9103716(A1), EP0316217.

The goal of this new invention is to provide a new and supplemental idea which provides better and more powerful signals and which is a major advance also in the creating of a better and higher sensitivity.

This new idea is based on the principle of the tuning fork. See FIGS. A, B and C, which describe various embodiments of a vibration sensor.

A tuning fork normally has two legs, and when the tuning fork is acted upon these two legs begin to vibrate relative to each other in opposite directions.

Figure 2:
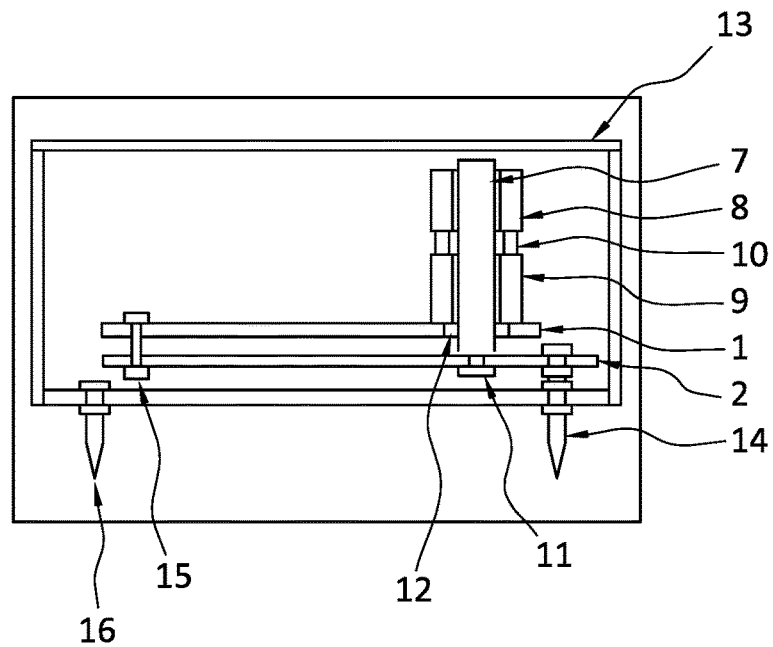

See FIG. 1, items 1 and 2; FIG. 2, items 1 and 2; and FIG. 3, items 1 and 2.

The result of the vibrating legs is that the air between the two legs will create a tone through its vibrations or pressure changes. The tone which the vibrating legs produce normally depends on the properties of their material (density, elasticity), but also the length of the legs, e.g., same length, long/short, or different length, but also their dimensions.

As a result, a normal tuning fork will create, e.g., chamber tone "a" and the tone normally has no higher or lower frequencies, which means that the result of this signal will be clear. This can sometimes be used, e.g., to make the legs vibrate for a longer time. Different leg length can be used for measurements when one wishes to produce a mixed signal for special recording or analysis.

Different length and/or material of the legs which are used in the same sensor can produce a shorter signal over time without reducing the amplitude.

PURPOSE AND FEATURES OF THE INVENTION

The goal of the invention is a vibration sensor comprising at least one magnet and at least one coil where the vibration sensor furthermore comprises a first leg, where the first leg is designed with a first mounting position and a second mounting position, and a second leg, where the second leg is designed with a first mounting position and a second mounting position, and where a coil unit, designed with at least one coil, is arranged at the first mounting position of the first leg, and where a permanent magnet holder, designed with at least one magnet, is arranged at the first mounting position of the second leg, and the coil unit surrounds the magnet unit so that the magnet unit can move relative to the coil unit and be surrounded by the coil unit, and where the first leg, in the second mounting position, is arranged relative to the second mounting position of the second leg so that the first leg at the first mounting position is arranged spring-like with a spacing from the second leg at the first mounting position. By a spring-like arrangement it is meant that the first leg can move partially, for example transmit vibrations, with respect to the second leg. When the first leg vibrates, it will be possible to detect vibrations by the movement of the permanent magnet holder relative to the coil unit. The two legs are arranged parallel and mounted partly or entirely fixed in the second mounting position with a spacing which is adjusted according to the area of application of the vibration sensor, but on the order of 5 mm to 5 cm.

Further embodiments of the invention include:

a ground nail is arranged at the second leg in the first mounting position of the second leg;

a ground nail is arranged at the second leg in the second mounting position of the second leg;

ground nails are arranged at the second leg such that one ground nail is arranged in the first mounting position of the second leg and one ground nail is arranged in the second mounting position of the second leg;

the first mounting position of the first leg is configured in the form of a hole through which the permanent magnet holder is arranged with respect to the second leg. Opposite the hole on the first leg is arranged the coil unit, the radius of the coil being advisedly equal to or almost equal in size to the radius of the hole;

the coil unit comprises two coils separated by a spacing ring;

the distance between the first mounting position of the first leg and the second mounting position of the first leg is variable in order to alter the sensitivity of the vibration sensor. By changing the distance between the mounting positions, the sensitivity of the vibration sensor can be changed, for example, varied between 1 cm and 40 cm. The change can be accomplished, for example, by a screw connection when the holder between the first leg and the second leg in the second mounting position can be loosened and moved, after which it can be secured once more.

The vibration sensor is enclosed in a package where at least one ground nail is arranged such that parts of the ground nail are arranged on the outside of the package for placement of the vibration sensor at a fixed point.

The package includes a wireless communication device for sensor data measured by the vibration sensor.

The distance between the first and second mounting positions, the size, weight and material of the legs are adjusted so that the vibration sensor is tuned to a certain given frequency based on the formula:

$$f = \frac{1.875^2}{2\pi l^2} \sqrt{\frac{EI}{\rho A}}$$

where f is the frequency, I is the length on the legs between the first and second mounting positions, E is the material in the modulus of elasticity of the legs, p is the material in the density of the legs, and A is the area of the legs.

DESCRIPTION OF EMBODIMENT AND FUNCTION

Figure 3:
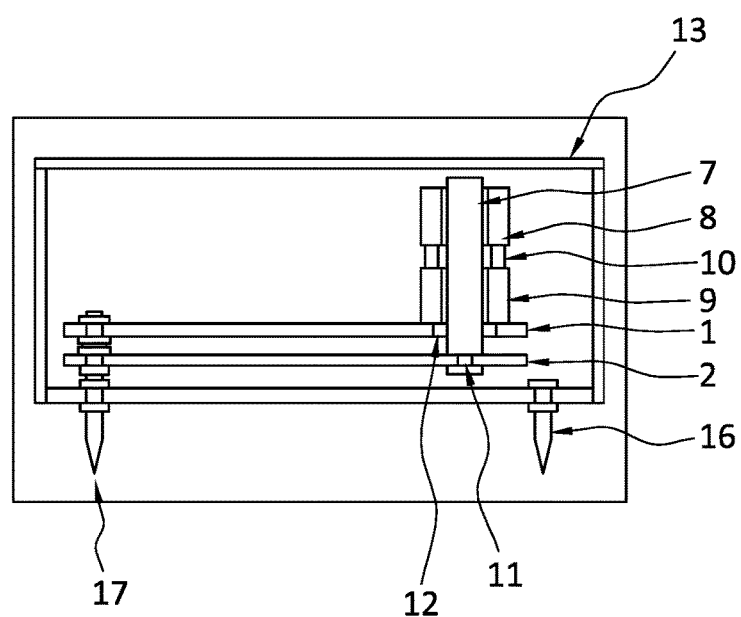

The new idea involves using the above-described counter-vibrations of the legs to produce induction signals by permanent magnets which are surrounded by coils, as shown in FIGS. 1, 2 and 3. The reference numbers showing:
1. First leg
2. Second leg
7. Permanent magnet holder
8. Coil
9. Coil
10. Spacing ring
11. Magnet holder fastening
12. Hole
13. Sensor box
14. Ground nail
15. Leg joint
16. Ground nail
17. Combined ground nail and leg joint The vibration sensor comprises two legs made of metal or plastic, for example. The first leg 1 and the second leg 2 are preferably in the shape of a thin rectangular oblong unit where a first mounting position and a second mounting position are arranged separated from each other. Preferably, when the vibration sensor is being assembled, the first mounting position of the first and second legs 1, 2 and the second mounting position of the first and second legs 1, 2 coincide.

A second leg 2 has a permanent magnet holder 7 mounted with a magnetic holder fastener 11, and the unit is combined by this new idea so that the permanent magnet holder 7 is surrounded by at least one coil, preferably two coils 8, 9, including spacing rings 10 which are arranged on the first leg 1. In this new arrangement, the permanent magnet holder 7 runs through a hole 12 in the first leg, on which the coils and the spacing rings (e.g., 8 and 9 and 10) are situated.

A similar type of unit with permanent magnets and coils is described in the patent SE 1300442-9.

The permanent magnet holder 7 is secured to the second leg 2 by a magnet holder fastening 11.

The coils 8, 9 which are mounted on the first leg 1 are separated from each other by the spacing rings 10.

The legs 1, 2 are constrained to move in different ways relative to each other depending on how they are connected to each other and to the sensor box 13, also known as the package.

In Sensor version A (FIG. 1), the second leg, also known as the lower leg 2, is mounted on the ground nails 14 together with the sensor box 13, and the first leg, also known as the upper leg 1, is connected to the lower leg by a leg joint 15. The leg joint is arranged between the second mounting position of the first leg 1 and the second mounting position of the second leg 2.

In Sensor version B (FIG. 2), only one end of the lower leg 2 is connected to the sensor box 13 and the ground nail 14. The second ground nail 16 is connected only to the sensor box 13. The two legs 1, 2 are connected to each other by a leg joint 15. The leg joint is arranged between the second mounting position of the first leg 1 and the second mounting position of the second leg 2.

In Sensor version C (FIG. 3), both legs 1, 2 are connected to each other only at one of their ends, together with the sensor box 13 via a combined leg joint and ground nail 17. The second ground nail 16 is only connected to the sensor box 13. The leg joint is arranged between the second mounting position of the first leg 1 and the second mounting position of the second leg 2.

Thanks to the relative motion between the permanent magnet holder 7 and the coils (e.g., 8, 9 and the spacer 10), inductive signals will be created similar to those described in patent SE1300442-9. The sensor box 13 can be provided with 1 to 3 or a number of other sensors, such as three sensors arranged in a triangle or four sensors in a rectangle or another two-dimensional unit with respective ground nails (e.g., 14, 16, 17). The sensor box 13 can also have a configuration of a ball with a number of sensors and various ground nails (e.g., 14, 16, 17) and create a three-dimensional unit.

The sensor box 13 can also be provided with any necessary equipment for transmission of signals wirelessly or by cable.

The permanent magnet holder 7 is free to move via a hole 12 in the leg 1. The respective counter-vibrations—between the central permanent magnet holder 7 and the surrounding coils (e.g., 8 and 9 and the spacer 10) and the spacer—are based on physical properties of a tuning fork.

The versions A, B and C will produce different strengths of inductive signals, depending on how the legs 1, 2 are connected to each other and/or connected to the sensor box 13 and/or the ground nails 14, 16, 17.

Benefits of the Invention

The new invention makes it possible to build sensors suitable for many different areas and also to measure slow vibrations with low amplitude.

This is possible thanks to the great number of different ways of varying the legs, such as lengths, weight and material, how they are connected to each other and how they are mounted in the sensor box.

The new inventions create sensors where pure "vibration" of the legs will create a very clear and pure signal without background noise created by the sensor itself (intrinsic noise).

The improved vibration sensor produces a distinct and pure signal with a very high signal amplitude which is initiated by the powerful inductive influence, up to two or more times, and produces a very low spontaneous background noise (intrinsic noise).

The invention claimed is:

1. A vibration sensor comprising at least one magnet and at least one coil, characterized in that the vibration sensor furthermore comprises:
   a first leg, where the first leg is designed with a first mounting position and a second mounting position, and
   a second leg, where the second leg is designed with a first mounting position and a second mounting position, and where a coil unit, designed with the at least one coil, is arranged at the first mounting position of the first leg, and where a magnet unit, designed with the at least one magnet, is arranged at the first mounting position of the second leg, and the coil unit surrounds the magnet unit so that the magnet unit can move relative to the coil unit and be surrounded by the coil unit, and where the first leg, in the second mounting position, is arranged with a spacing relative to the second mounting position of the second leg so that the first leg at the first mounting position is arranged spring-like with respect to the second leg at the first mounting position.

2. The vibration sensor comprising the at least one magnet and the at least one coil according to claim 1 characterized in that a ground nail is arranged at the second leg in the first mounting position of the second leg.

3. The vibration sensor comprising the at least one magnet and at least one coil according to claim 1 characterized in that a ground nail is arranged at the second leg in the second mounting position of the second leg.

4. The vibration sensor comprising the at least one magnet and the at least one coil according to claim 1 characterized in that ground nails are arranged at the second leg such that one ground nail is arranged in the first mounting position of the second leg and one ground nail is arranged in the second mounting position of the second leg.

5. The vibration sensor comprising the at least one magnet and the at least one coil according to claim 1 any characterized in that the first mounting position of the first leg is configured in the form of a hole through which the magnet unit is arranged with respect to the second leg.

6. The vibration sensor comprising the at least one magnet and the at least one coil according to claim 5 characterized in that the coil unit comprises two coils separated by a spacing ring.

7. The vibration sensor comprising the at least one magnet and the at least one coil according to claim 1 characterized in that the distance between the first mounting position of the first leg and the second mounting position of the first leg is variable in order to alter the sensitivity of the vibration sensor.

8. The vibration sensor comprising the at least one magnet and the at least one coil according to claim 1 characterized in that the vibration sensor is enclosed in a package where at least one ground nail is arranged such that parts of the ground nail are arranged on the outside of the package for placement of the vibration sensor at a fixed point.

9. The vibration sensor comprising the at least one magnet and the at least one coil according to claim 8 characterized in that the package includes a wireless communication device for sensor data measured by the vibration sensor.

10. The vibration sensor comprising the at least one magnet and the at least one coil according to claim 1 characterized in that the distance between the first and second mounting positions, the size, weight and material of the legs are adjusted so that the vibration sensor is tuned to a certain given frequency based on the formula:

$$f = \frac{1.875^2}{2\pi l^2} \sqrt{\frac{EI}{\rho A}}$$

where f is the frequency, l is the length on the legs between the first and second mounting positions, E is the material in the modulus of elasticity of the legs, ρ is the material in the density of the legs, and A is the area of the legs.

* * * * *